United States Patent
Perrin et al.

(10) Patent No.: US 12,508,720 B2
(45) Date of Patent: Dec. 30, 2025

(54) END EFFECTOR INCLUDING CUTTING BLADE AND PULLEY ASSEMBLY

(71) Applicant: KUBOTA CORPORATION, Osaka (JP)

(72) Inventors: Michael Perrin, Sakai (JP); Pius Ng, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 433 days.

(21) Appl. No.: 17/961,666

(22) Filed: Oct. 7, 2022

(65) Prior Publication Data
US 2024/0116193 A1    Apr. 11, 2024

(51) Int. Cl.
| | | |
|---|---|---|
| B25J 15/00 | (2006.01) | |
| A01G 3/037 | (2006.01) | |
| B25J 15/02 | (2006.01) | |
| A01G 3/02 | (2006.01) | |

(52) U.S. Cl.
CPC .......... B25J 15/0066 (2013.01); A01G 3/037 (2013.01); B25J 15/0019 (2013.01); B25J 15/0028 (2013.01); B25J 15/0038 (2013.01); B25J 15/0233 (2013.01); *A01G 2003/023* (2013.01)

(58) Field of Classification Search
CPC ............... A01G 2003/023; A01G 3/037; B25J 15/0233; B25J 15/0038; B25J 15/0028; B25J 15/0019; B25J 15/0066
See application file for complete search history.

(56) References Cited

U.S. PATENT DOCUMENTS

| | | | |
|---|---|---|---|
| 6,544,626 B1 * | 4/2003 | Minges | A43B 13/226 |
| | | | 428/167 |
| 7,854,108 B2 | 12/2010 | Koselka et al. | |
| 8,250,765 B2 * | 8/2012 | Wu | A01G 3/0255 |
| | | | 30/249 |
| 9,226,446 B2 | 1/2016 | Moore | |
| 9,475,189 B2 | 10/2016 | Kahani | |
| 9,554,512 B2 | 1/2017 | Davidson et al. | |
| 9,820,444 B2 | 11/2017 | Held | |

(Continued)

FOREIGN PATENT DOCUMENTS

| | | |
|---|---|---|
| AU | 2021103745 A4 | 8/2021 |
| DE | 198 15 009 A1 | 10/1999 |

(Continued)

OTHER PUBLICATIONS

Silwal et al., "Bumblebee: A Path Towards Fully Autonomous Robotic Vine Pruning", Cornell University, https://doi.org/10.48550/arXiv.2112.00291, Dec. 1, 2021, 35 pages.

(Continued)

*Primary Examiner* — Liang Dong
(74) *Attorney, Agent, or Firm* — Keating & Bennett, LLP

(57) ABSTRACT

A cutting device includes a base plate, a motor attached to the base plate, a driving cord including a first end and a second end, the first end being attached to the motor, and a cutting assembly. The cutting assembly includes a fixed blade that is fixed to the base plate, and a driven blade that moves with respect to the fixed blade. The second end of the driving cord is attached to the driven blade to move the driven blade with respect to the fixed blade when the motor rotates.

19 Claims, 12 Drawing Sheets

(56) References Cited

U.S. PATENT DOCUMENTS

| | | |
|---|---|---|
| 10,462,972 B2 | 11/2019 | Moore |
| 10,602,664 B1 | 3/2020 | Stubbs et al. |
| 10,757,861 B2 | 9/2020 | Robertson et al. |
| 2015/0151433 A1* | 6/2015 | Rust ............... B25J 15/0213 294/106 |
| 2017/0105346 A1* | 4/2017 | Davidson ............ A01D 46/30 |
| 2018/0220599 A1* | 8/2018 | Kitchen ............. A01G 23/081 |
| 2019/0380278 A1 | 12/2019 | Burden |
| 2021/0068349 A1* | 3/2021 | Sabic ................. A01G 3/037 |
| 2021/0076572 A1* | 3/2021 | Lam ................... A01G 3/037 |
| 2021/0153437 A1* | 5/2021 | Liu .................... A01D 46/30 |
| 2021/0204490 A1 | 7/2021 | Bartrom |

FOREIGN PATENT DOCUMENTS

| | | |
|---|---|---|
| DE | 10 2005 039 084 A1 | 2/2007 |
| DE | 10 2014 016 272 B4 | 1/2018 |
| EP | 0 895 712 A1 | 2/1999 |
| EP | 1 909 556 B1 | 10/2011 |
| EP | 1 891 853 B1 | 7/2013 |
| EP | 2 979 538 B1 | 9/2017 |
| EP | 3 430 885 A1 | 1/2019 |
| EP | 3 017 686 B1 | 1/2020 |
| EP | 3 155 891 B1 | 11/2020 |
| KR | 10-2021-0138953 A | 11/2021 |
| SE | 527 723 C2 | 5/2006 |
| WO | WO-2015067327 A1 * | 5/2015 ........... A01G 3/0255 |
| WO | 2021/038127 A1 | 3/2021 |
| WO | WO-2021178408 A1 * | 9/2021 ............. A01D 46/00 |

OTHER PUBLICATIONS

Paulin et al., "A specialised collision detector for grape vines", Proceedings of ACRA 2015: Australasian Conference on Robotics and Automation, Dec. 2-4, 2015, 6 pages.

PELLENC America, "Vine Pruning Shears—Vinion", https://pellencus.com/products/hand-tools/vinion-vine-pruning-shears/, retrieved on Mar. 9, 2023, pp. 1-12.

Anattasakul et al., "Robotic Arm Mount Assembly Including Rack and Pinion", U.S. Appl. No. 17/961,668, filed Oct. 7, 2022.

Anattasakul et al., "Agricultural Tool", U.S. Appl. No. 17/961,671, filed Oct. 7, 2022.

Anattasakul et al., "Agricultural Tool", U.S. Appl. No. 17/961,676, filed Oct. 7, 2022.

Anattasakul et al., "Agricultural Clip", U.S. Appl. No. 17/961,678, filed Oct. 7, 2022.

Ng et al., "Agricultural Tool and Process", U.S. Appl. No. 17/961,680, filed Oct. 7, 2022.

Ng et al., "Agricultural Tool and Process", U.S. Appl. No. 17/961,682, filed Oct. 7, 2022.

Official Communication issued in corresponding European Patent Application No. 23193782.2, mailed on Feb. 9, 2024.

* cited by examiner

END EFFECTOR INCLUDING CUTTING BLADE AND PULLEY ASSEMBLY

BACKGROUND

1. Field of the Invention

The present invention relates to an end effector for use by a robotic arm assembly. More specifically, the present invention relates to an end effector which includes a cutting blade which is actuated through an assembly which is driven by a motor.

2. Description of the Related Art

Robotic arms have been used in industrial applications for assembling, conveying, milling, printing, and the like. Robotic arms are typically provided with end effectors which are structured to perform specific operations. End effectors including cutting blades for pruning or slicing tree limbs, vines, branches, etc. are known. However, these known end effectors are oversized and typically have weak cutting forces.

SUMMARY OF THE INVENTION

Preferred embodiments of the present invention are directed to cutting devices that each provide an end effector of reduced size and improved cutting forces.

A cutting device according to a preferred embodiment of the present invention includes a base plate, a motor attached to the base plate, a driving cord including a first end and a second end, the first end being attached to the motor, and a cutting assembly.

In a preferred embodiment of the present invention, the cutting assembly includes a fixed blade that is fixed to the base plate, and a driven blade that moves with respect to the fixed blade, and the second end of the driving cord is attached to the driven blade to move the driven blade with respect to the fixed blade when the motor rotates.

In a preferred embodiment of the present invention, a cutting pulley is attached to a side surface of a lever end of the driven blade and supports the driving cord, and the motor includes a motor driven pulley to which the first end of the driving cord is affixed.

In a preferred embodiment of the present invention, a support pulley is affixed to the base plate, and a portion of the driving cord which is located between the first end and the second end is engaged with the support pulley. The support pulley can include a spool and a bearing which are connected to the base plate in a manner such that the spool may rotate with respect to the base plate. The support pulley can include a first support pulley and a second support pulley, the first support pulley includes a first spool and a first bearing, the second support pulley includes a second spool and a second bearing, and the first spool and the first bearing are axially spaced apart from the second spool and the second bearing.

In a preferred embodiment of the present invention, a diameter of the support pulley is greater than a diameter of the motor driven pulley.

In a preferred embodiment of the present invention, the driving cord has a serpentine or zig-zag shape when the driving cord contacts the motor driven pulley, the support pulley, the cutting pulley, and the driven blade.

In a preferred embodiment of the present invention, the fixed blade is attached to the base plate by fasteners which extend through a base of the fixed blade, and the fasteners are spaced apart from one another along an extending direction of the fixed blade. The base of the fixed blade is spaced away from the base plate with a gap therebetween.

In a preferred embodiment of the present invention, the cutting device further includes a gripper which is structured to grasp an object which is being cut by the cutting assembly. The gripper can include a pair of gripping arms which are structured to actuate towards and away from one another. The gripping arms can include first gripping surfaces and second gripping surfaces each including ridged gripping projections. Each of the pair of gripping arms can include an indented portion between the first gripping surfaces and the second gripping surfaces of each of the gripping arms.

In a preferred embodiment of the present invention, the gripping arms are connected to respective actuating arms which are driven to open and close in conjunction with operation of the cutting assembly. The actuating arms are driven such that the gripper will close to grasp the object before the object is cut by the cutting assembly such that the gripper will hold and support the object after the object has been cut. The gripper can be operated directly or indirectly by the motor. The gripper can be operated by a driven gear shaft which is rotated by an additional cord connected to the motor, and the driven gear shaft can include a pinion gear which meshes with an arm gear of the gripper.

In a preferred embodiment of the present invention, the gripper further includes actuating arms which are connected to projections of the arm gear, the actuating arms articulate gripping arms of the gripper once the pinion gear meshes with the arm gear.

In a preferred embodiment of the present invention, the cutting device further includes a cover which covers portions of the motor, the driving cord, and the cutting assembly. The cover can include a housing and a lid which is removable from the housing.

In a preferred embodiment of the present invention, the cutting device further includes a controller configured or programmed to control the motor, and the controller is configured or programmed to estimate a motor torque required to cut an object of a specific size and/or determine that the object has been cut.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
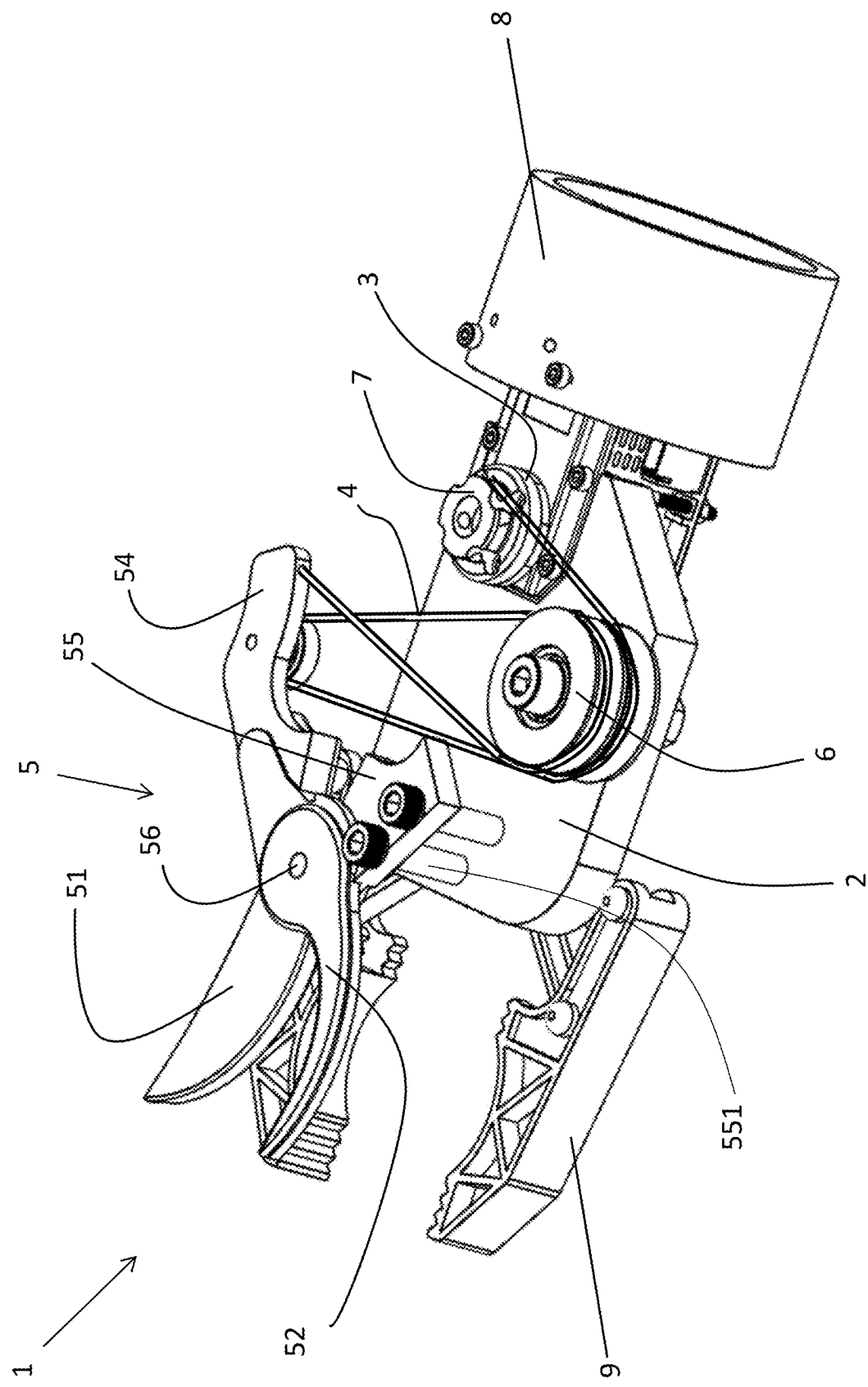
FIG. 1 shows a left side perspective view of an end effector, for use by a robotic arm assembly, including a cutting blade and pulley assembly according to a preferred embodiment of the present invention.

FIGS. 1-5 show a preferred embodiment of a cutting device 1 according to a preferred embodiment of the present invention which preferably includes a base plate 2, a motor 3, a driving cord 4, and a cutting assembly 5 including a fixed blade 51 and a driven blade 52. The driven blade 52 moves with respect to the fixed blade 51 and is actuated to perform a cutting action together with the fixed blade 51. The motor 3 and the fixed blade 51 are both attached to and supported on the base plate 2 in a fixed manner. The motor 3 is preferably housed in a motor housing 10 which is defined by a portion of the base plate 2, or defined by a separate structure fixed to the base plate 2. The motor 3 is preferably, for example, a servo motor.

The driving cord 4 includes a first end 41 which is pulled due to rotation of the motor 3, and a second end 42 which is connected to the driven blade 52. The motor 3 preferably includes a motor driven pulley 7 to which the first end 41 is affixed and which is rotated by the motor 3 to actuate the driven blade 52. In a preferred embodiment, the second end 42 of the driving cord 4 is attached to the driven blade 52 to move the driven blade 52 with respect to the fixed blade 51 when the motor 3 rotates.

Figure 4:
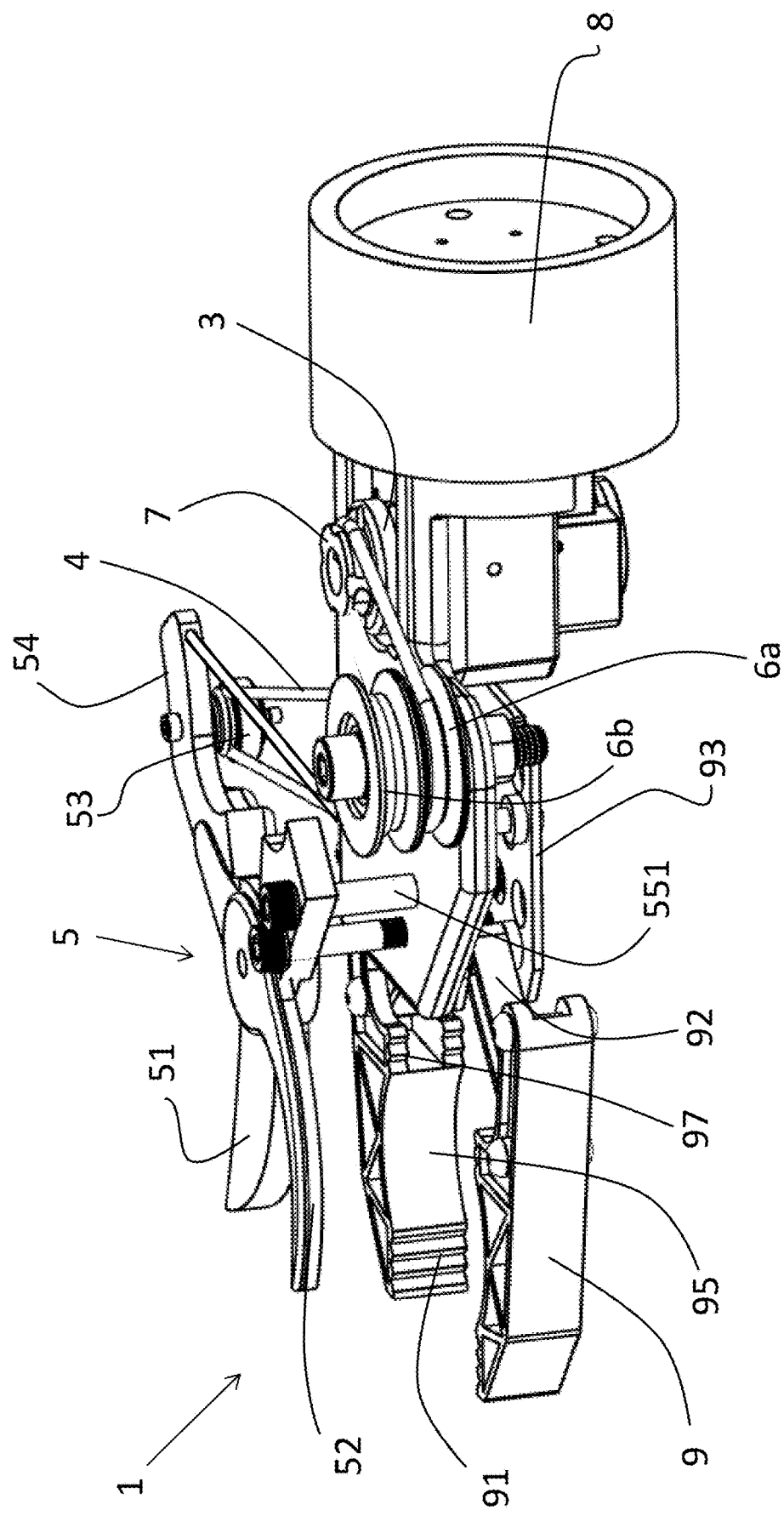
FIG. 4 shows a bottom side perspective view of an end effector according to a preferred embodiment of the present invention.

A support pulley 6 is preferably mounted to a surface of the base plate 2 at a lateral side of the cutting device 1 opposite to another lateral side of the cutting device 1 where a lever end 54 of the driven blade 52 is located. The support pulley 6 preferably includes two or more support pulleys 6. For example, as shown in FIG. 4, the support pulley can include a bottom support pulley 6a (e.g., a first support pulley) located adjacent to the base plate 2, and a top support pulley 6b (e.g., a second support pulley) located farther from the base plate 2 than the bottom support pulley 6a. In a preferred embodiment, the bottom support pulley 6a and the top support pulley 6b are coaxial. The support pulley 6 engages with and supports the driving cord 4, as discussed in more detail below.

Figure 6:
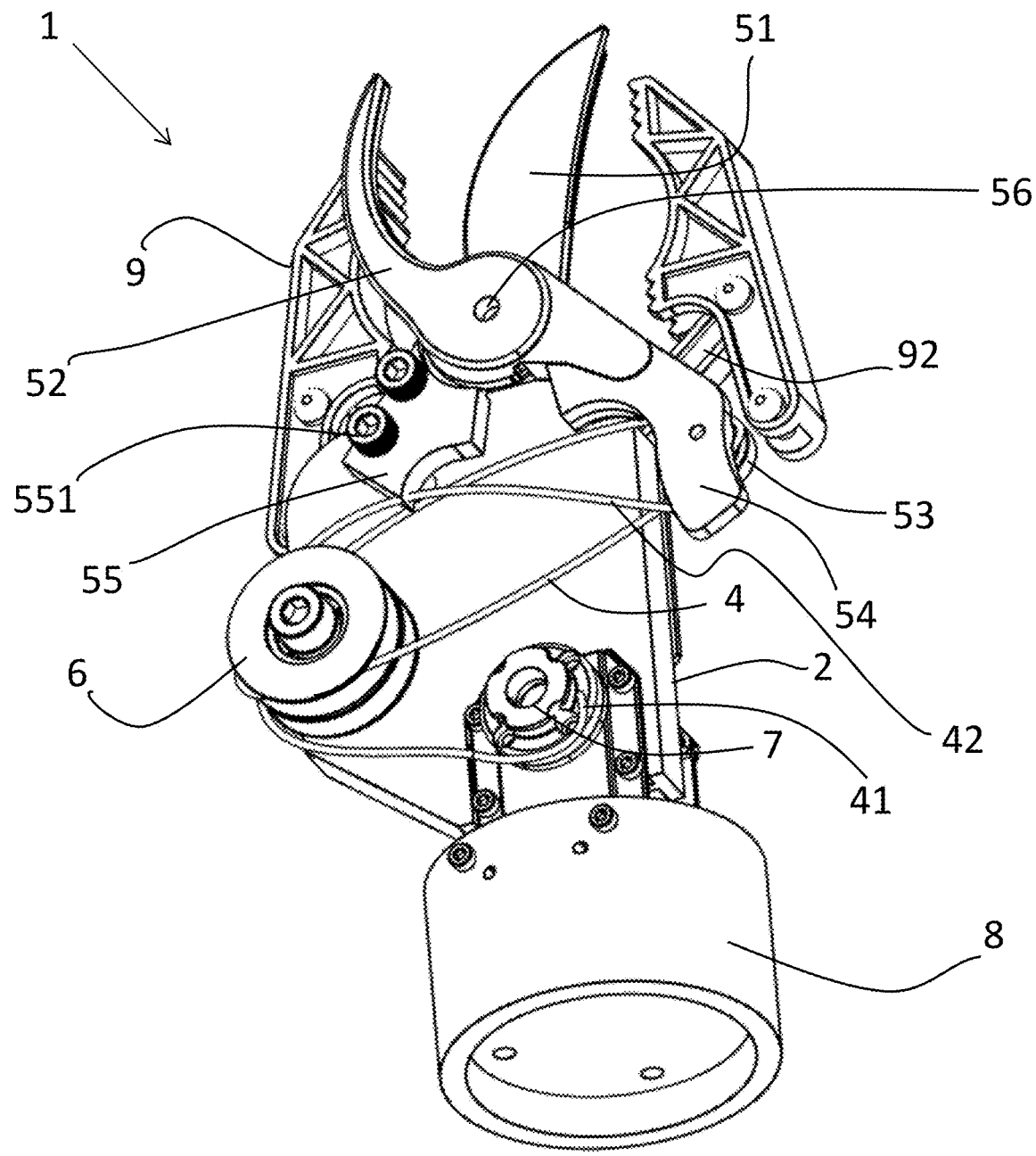
FIG. 6 shows a left side perspective view of an end effector with a detailed depiction of a driving cord according to a preferred embodiment of the present invention.

As shown in FIG. 6, the first end 41 of the driving cord 4 is preferably connected to the motor driven pulley 7. The driving cord 4 preferably extends from the motor driven pulley 7 to the bottom support pulley 6a and is wrapped around the bottom support pulley 6a before extending to a cutting pulley 53 attached to and arranged on a side surface of the lever end 54 of the driving blade 52. The driving cord 4 wraps around the cutting pulley 53 before extending to the top support pulley 6b. Finally, the driving cord 4 wraps around the top support pulley 6b and extends to the lever end 54 of the driving blade 52, and the second end 42 of the driving cord 4 is preferably connected to the lever end 54 of the driving blade 52. The driving cord 4 preferably has, for example, a serpentine or zig-zag shape when the driving cord 4 is connected to or supported by the driven pulley 7, the bottom support pulley 6a, the cutting pulley 53, the top support pulley 6b, and the lever end 54 of the driving blade 52. The driving cord 4 may be defined by a single continuous cord, or may be defined by multiple cords.

Figure 2:
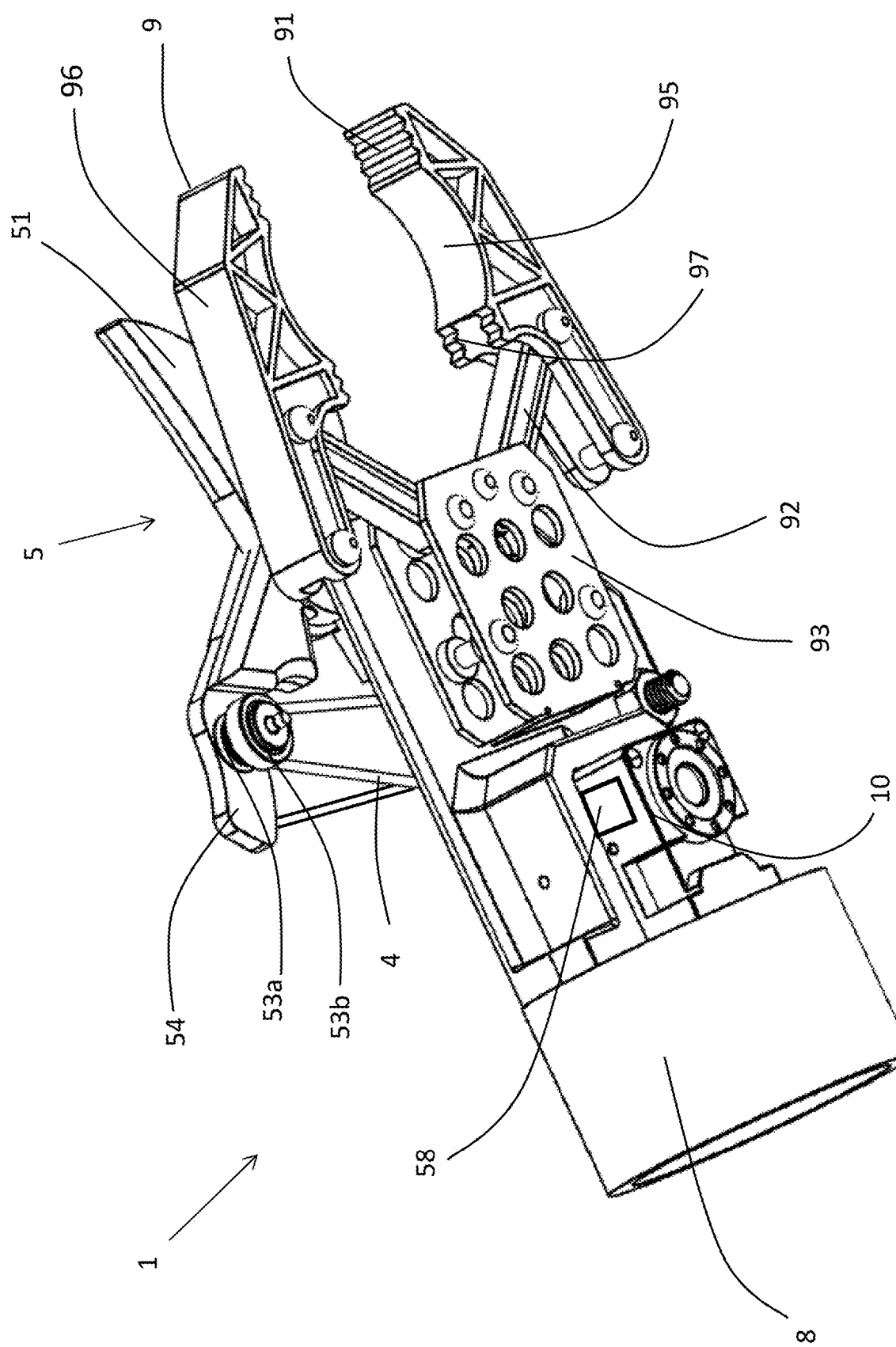
FIG. 2 shows a right side perspective view of an end effector according to a preferred embodiment of the present invention.
Figure 3:
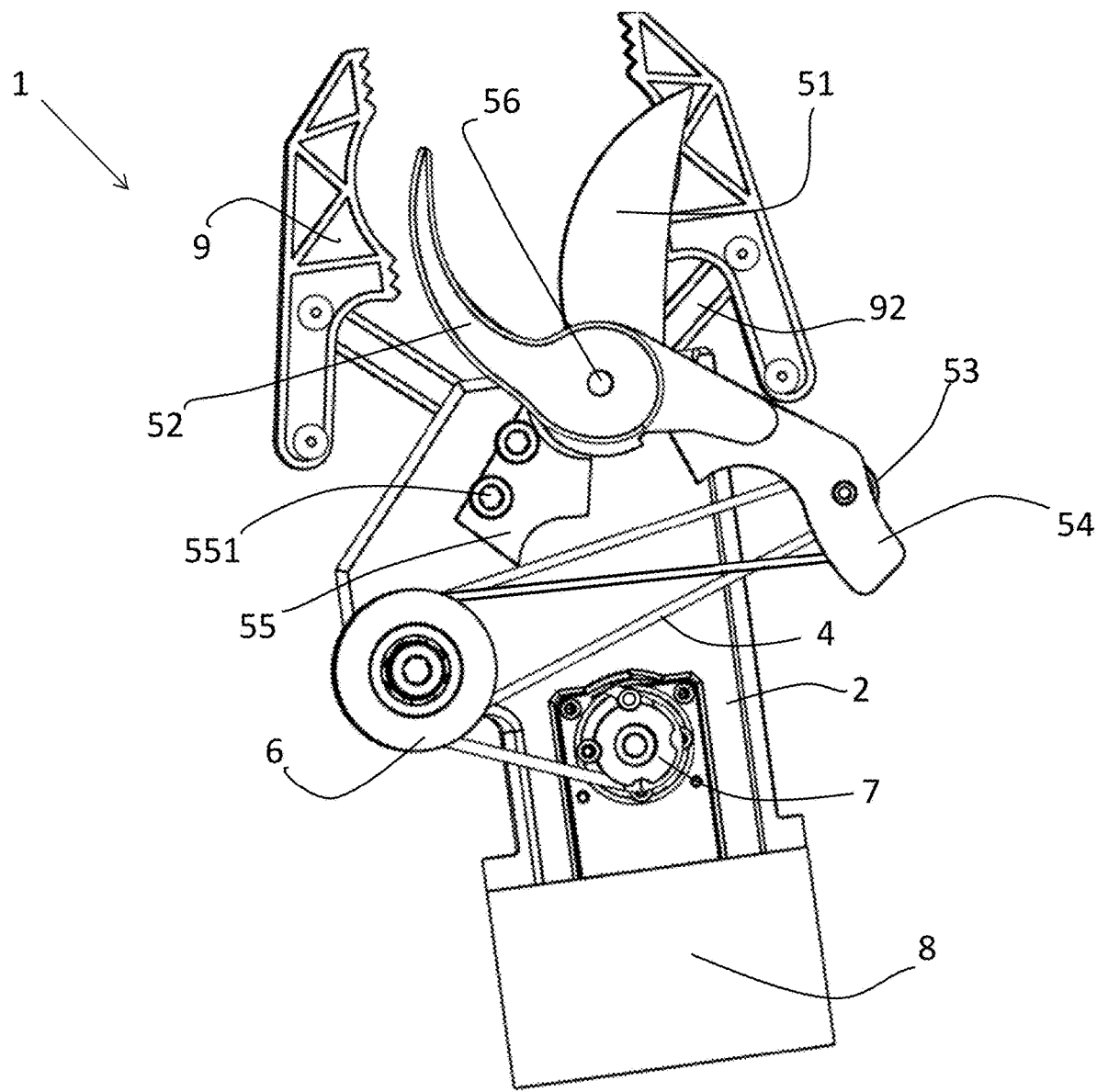
FIG. 3 shows a left side view of an end effector according to a preferred embodiment of the present invention.

In a preferred embodiment of the present invention, the cutting pulley 53 can include two bearings. For example, as shown in FIG. 2, the cutting pulley 53 can include a first bearing 53a attached to, and located adjacent to, the side surface of the lever end 54 of the driving blade 52, and a second bearing 53b that is larger than the first bearing 53a and that is located on an outside of the first bearing 53a farther away from the side surface of the lever end 54 of the driving blade 52 than the first bearing 53a, for example. In a preferred embodiment, when the driving cord 4 is driven by rotation of the motor 3, the driving cord 4 moves along the surface of the first bearing 53a, and the second bearing 53b prevents the driving cord 4 from losing contact with the surface of the first bearing 53a. For example, the second bearing 53b prevents the driving cord 4 from sliding off of the first bearing 53a in a direction away from the side surface on the lever end 54 of the driving blade 52 to which the first bearing 53a is attached.

A preferred embodiment of the cutting device 1 may include another arrangement of the driving cord 4 if so desired. For example, in a preferred embodiment of the present invention, the driving cord 4 can extend from the driven pulley 7, to the support pulley 6 (e.g., a single support pulley), and then directly to the lever end 54 of the driving blade 52.

In a preferred embodiment of the present invention, the driven pulley 7 preferably has a smaller diameter than that of the support pulley 6. For example, in a preferred embodiment, at least one of a diameter of the bottom support pulley 6a and a diameter of the top support pulley 6b is at least twice a diameter of the motor driven pulley 7. In a preferred embodiment, the driven pulley 7 is located closer to the arm mount 8 than to a pivot point 56 at which the fixed blade 51 and the driven blade 52 are joined together to define the cutting assembly 5.

If the support pulley 6 includes multiple pulleys, the multiple pulleys preferably have identical or substantially identical dimensions. The support pulley 6 preferably has a larger diameter than the cutting pulley 53. By including the driven pulley 7, the support pulley 6, and the cutting pulley 53, it is possible to increase an amount of effective torque applied by the motor 3 onto the driving cord 4 to thereby improve the overall cutting force of the cutting assembly 5.

The support pulley 6 preferably includes a spool which is press fit onto a bearing such that the spool may rotate while being attached to the base plate 2. If multiple support pulleys 6 are provided, the spools and bearings of the multiple support pulleys 6 (e.g., the bottom support pulley 6a and the top support pulley 6b) are spaced apart from one another axially to prevent friction between the components of the multiple support pulleys 6. The driven pulley 7 also preferably includes a spool.

The fixed blade 51 is preferably fixed to the base plate 2 with two or more fasteners 551 which extend through a base 55 of the fixed blade 51. The fasteners 551 are spaced apart from one another along an extending direction of the fixed blade 51. The fasteners 551 preferably act as standoffs such that the fixed blade 51 is spaced away from the base plate 2 with a gap, preferably an empty gap, therebetween. As discussed above, the fixed blade 51 and the driven blade 52 are joined together at the pivot point 56 to define the cutting assembly 5.

The cutting device 1 preferably further includes a gripper 9 which is structured to grasp a cane, tree limb, vine, branch, etc. (e.g., an object) which is to be cut by the cutting assembly 5. The gripper 9 preferably includes a pair of gripping arms 96 which are structured to move towards and away from one another. The gripping arms 96 preferably include first gripping surfaces 91 and second gripping surfaces 97 with ridged gripping projections which are structured to provide gripping friction. An indented portion 95 is preferably provided between the first gripping surfaces 91 and the second gripping surfaces 97 of each of the gripping arms 96. The indented portions 95 make it possible for the gripper 9 to firmly hold a tree limb, vine, branch, etc. even if it has an uneven surface.

The gripping arms 96 are connected to respective actuating arms 92 which are driven to open and close in conjunction with operation of the cutting assembly 5. The actuating arms 92 are preferably connected to the base plate 2 while being rotatably mounted to at least one gripping support plate 93. Preferably, two gripping support plates 93 are provided to sandwich the actuating arms 92 therebetween with rivets, bolts, or other fasteners connecting the gripping support plates 93 to the base plate 2. The gripping support plates 93 are also preferably connected to the base plate 2 through at least one of the rivets, bolts, or other fasteners.

The actuating arms 92 are preferably driven such that the gripper 9 will close to grasp a cane, tree limb, vine, branch, etc. before the cane, tree limb, vine, branch, etc. is cut by the cutting assembly 5 such that the gripper 9 will hold and support the cane, tree limb, vine, branch, etc. after it has been cut. The gripper 9 is preferably operated directly or indirectly by the motor 3 but could also be actuated in some other manner if so desired.

Figure 5:
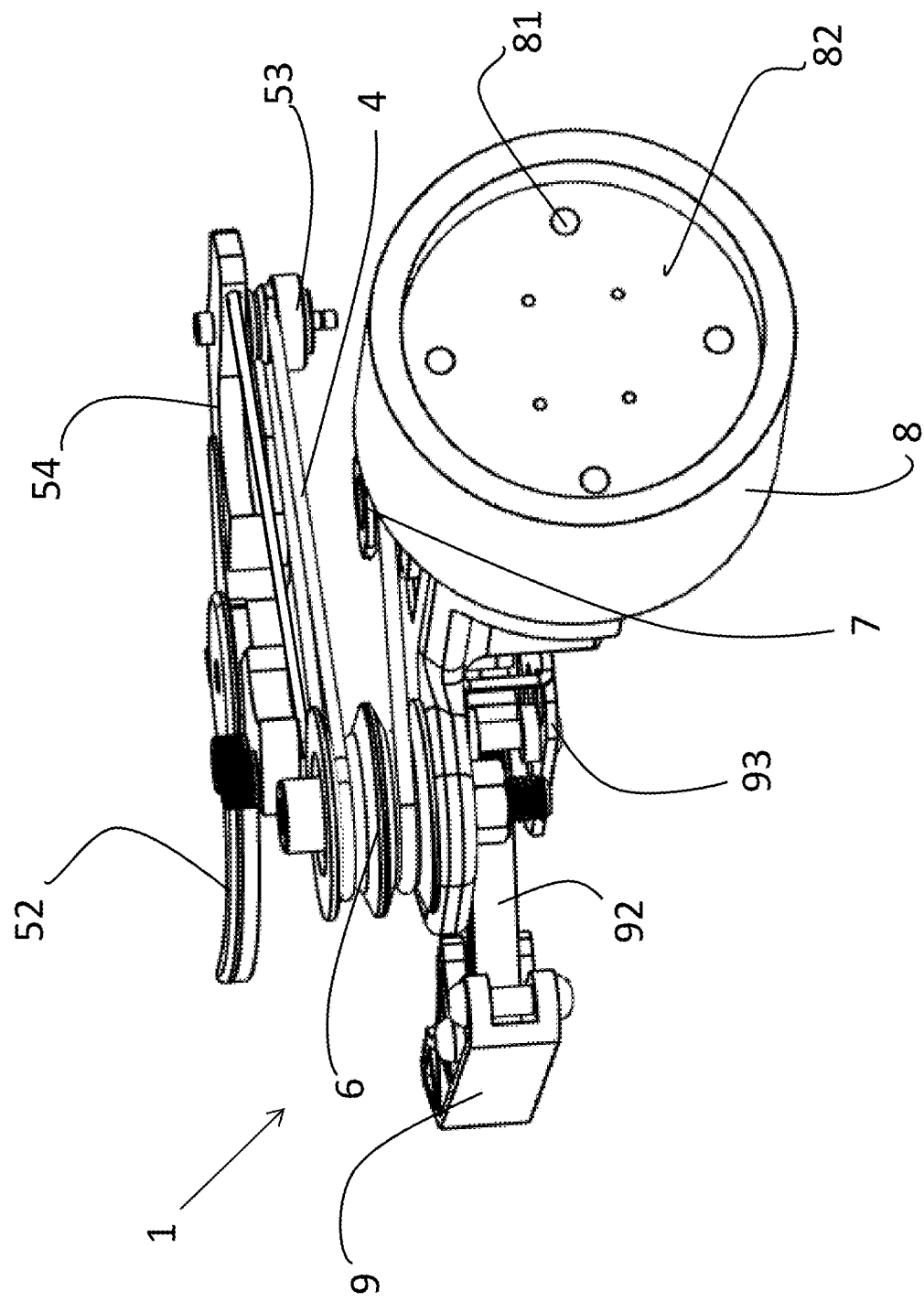
FIG. 5 shows an attaching end of an end effector according to a preferred embodiment of the present invention.

As shown in FIG. 5, the cutting device 1 preferably further includes an arm mount 8 which is structured to be connected to a robotic arm assembly. The arm mount 8 preferably includes at least one mounting hole 81 defined in a recessed mounting surface 82. Preferably, at least four larger mounting holes 81 and four smaller mounting holes 81 are provided. Even more preferably, the smaller mounting holes 81 are provided at an inner portion of the recessed mounting surface 82 and the larger mounting holes 81 are provided about a circumference or outer portion of the recessed mounting surface 82.

Figure 7:
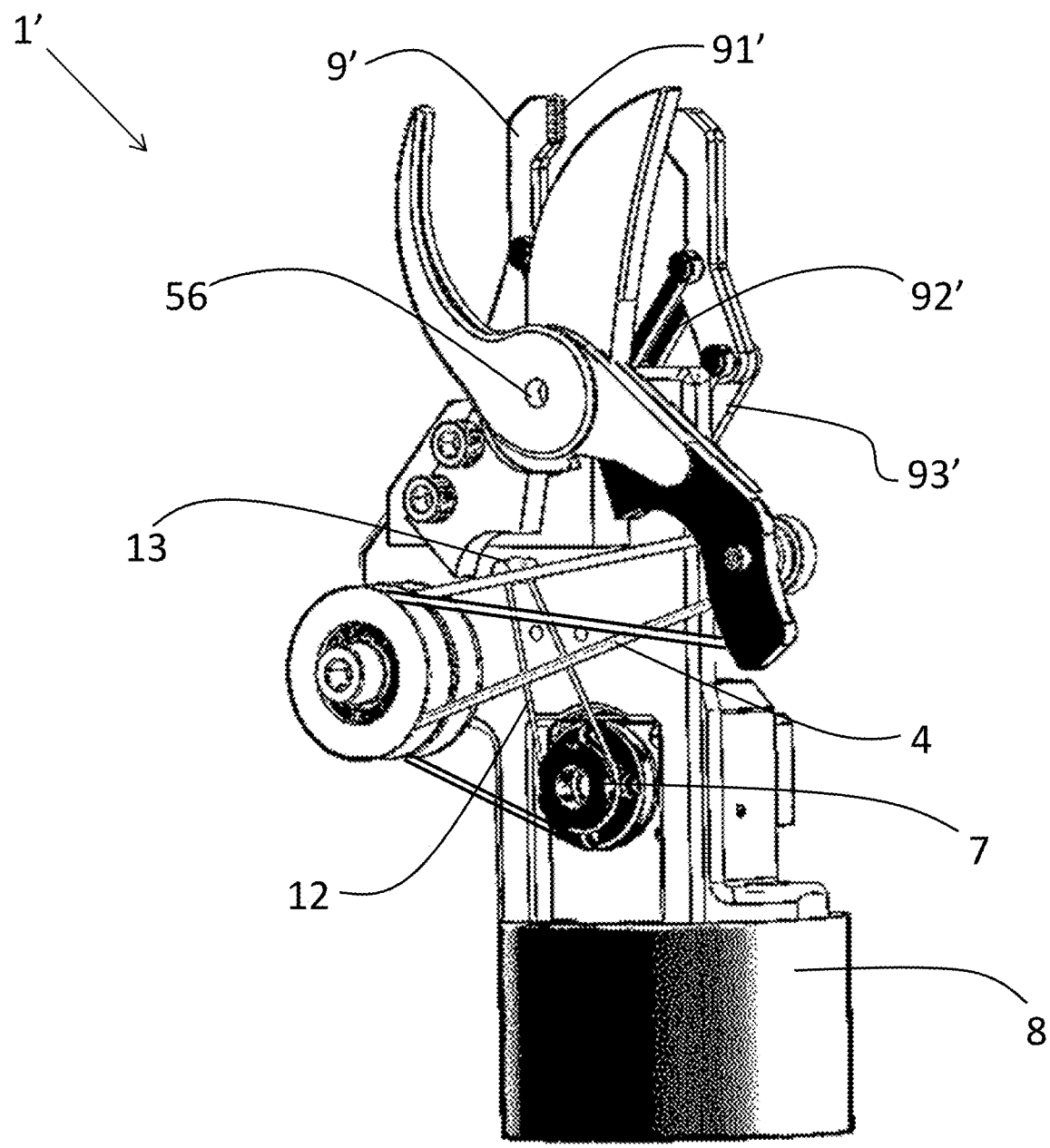
FIG. 7 shows a left side perspective view of an end effector, for use by a robotic arm assembly, including a cutting blade and pulley assembly according to another preferred embodiment of the present invention.
Figure 8:
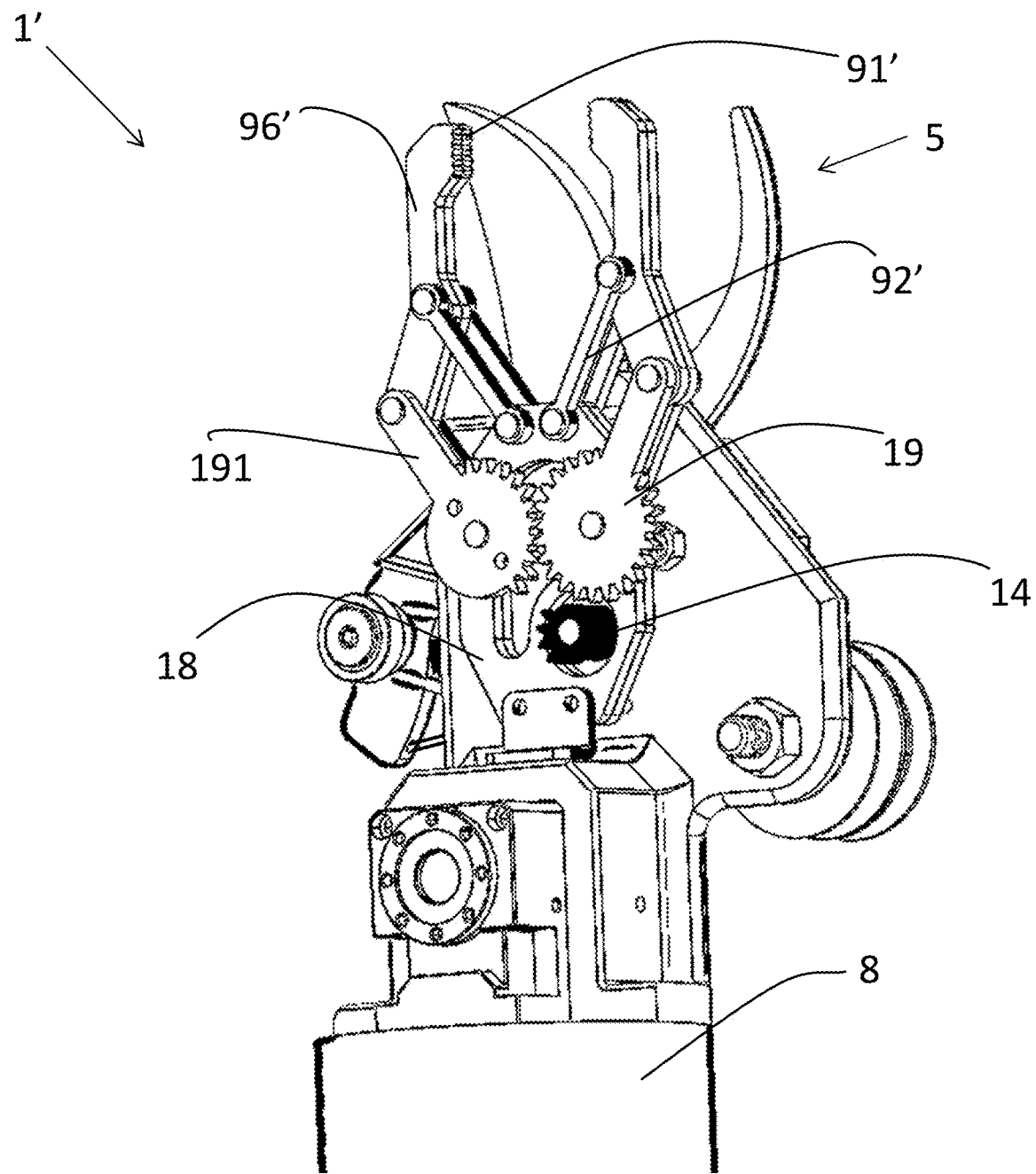
FIG. 8 shows a right side perspective view of the end effector shown in FIG. 7.
Figure 9:
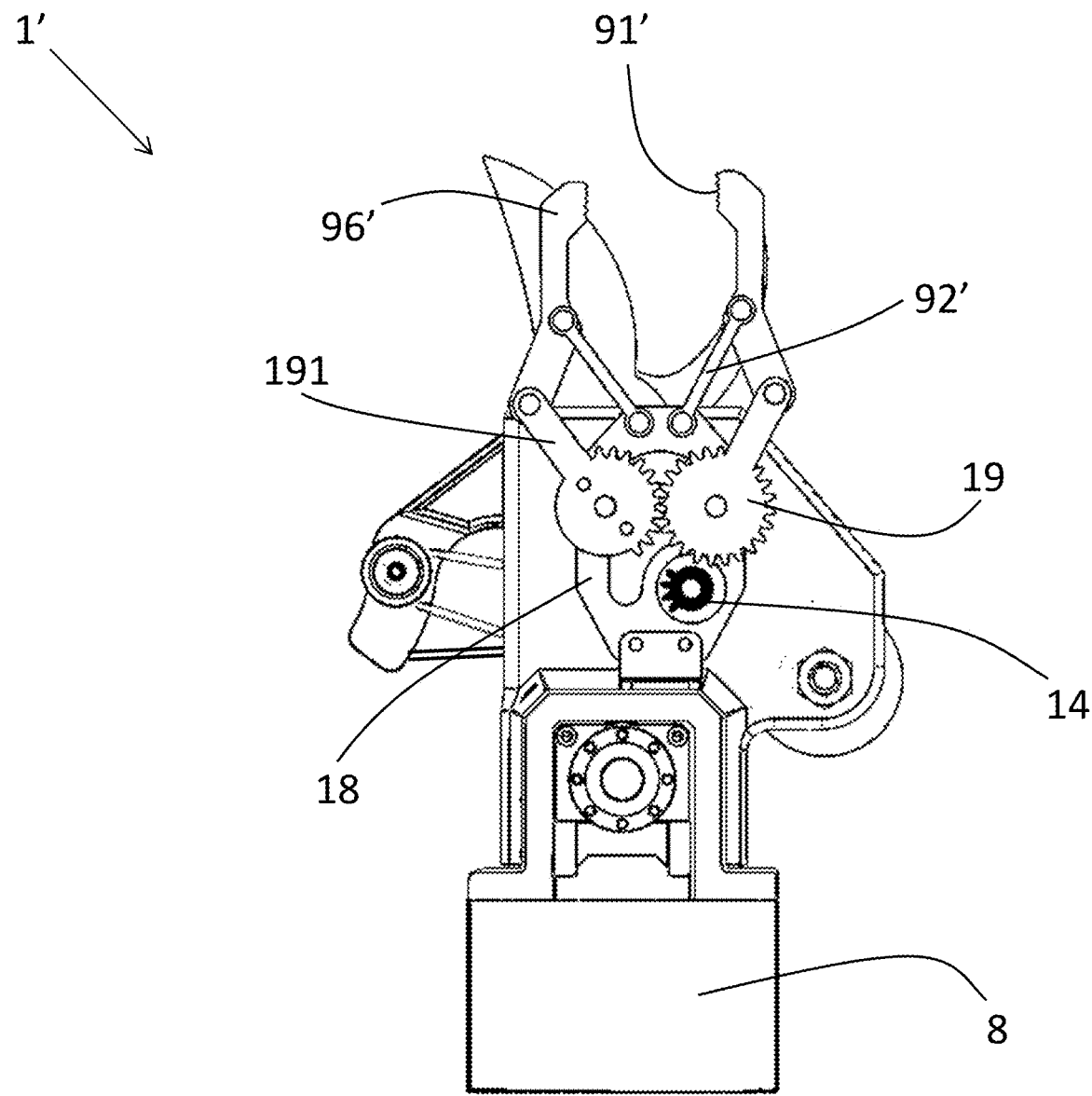
FIG. 9 shows a right side view of the end effector shown in FIG. 7.

FIGS. 7-9 show another preferred embodiment of a cutting device 1' according to a preferred embodiment of the present invention. The cutting device 1' preferably includes all of the features of the cutting device 1, but with a few modifications to a gripper 9' and an actuation of the gripper 9'. The cutting device 1' preferably includes a second cord 12 which is driven by the motor to rotate a driven gear shaft 13. A portion of the driven gear shaft 13 passes through the base plate 2 and includes a pinion gear 14. The pinion gear 14 preferably meshes with one of the arm gears 19 of the gripper 9' once the driven gear shaft 13 has been rotated by a specific amount, with the one of the arm gears 19 further meshing with and rotating another one of the arm gears 19. The gripper 9' further includes actuating arms 92' which are connected to projections 191 of the arm gears 19, and the actuating arms 92' articulate gripping arms 96' of the gripper 9' once the pinion gear 14 meshes with the arm gears 19.

With this structure, opening and closing of the gripper 9' is driven by the motor 3 via the driven pulley 7 pulling the second cord 12. The other preferred embodiment of a cutting device 1' preferably has a same cord arrangement of the driving cord 4 as that shown in FIG. 6 for actuating the cutting assembly 5.

Figure 10:
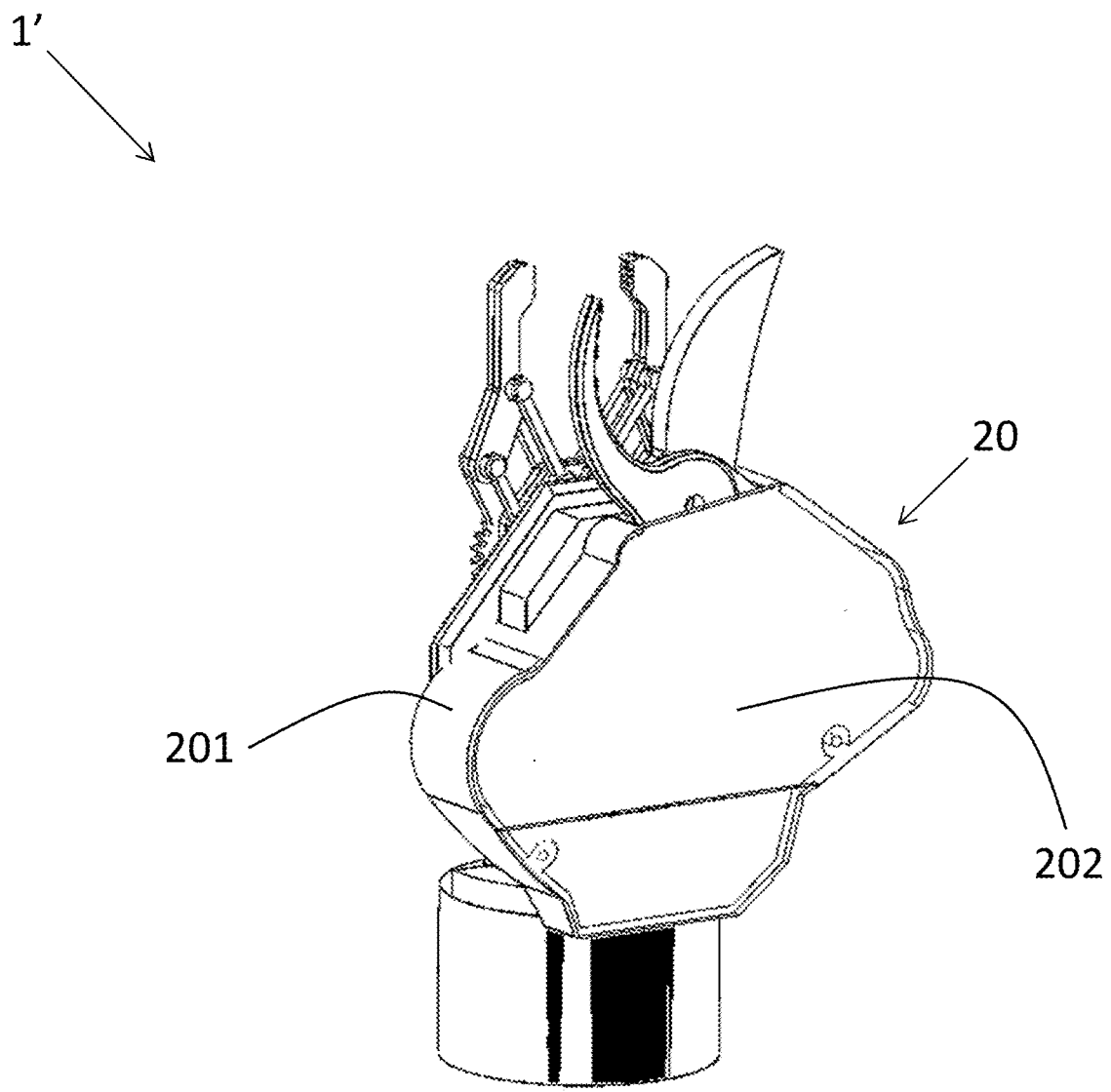
FIG. 10 shows a right side perspective view of an end effector, for use by a robotic arm assembly, including a cutting blade and pulley assembly according to yet another preferred embodiment of the present invention.

FIG. 10 shows a modification of a preferred embodiment of the cutting device 1' in which a cover 20 which includes a housing 201 and a removable lid 202 is provided to cover actuating components including the driving cord 4, the second cord 12, the lever end 54 of the driving blade 52, and the driven pulley 7. The lid 202 is preferably removably attached to the housing 201 through fasteners. The cover 20 provides protection of the actuating components to keep them from being damaged during operation in the field (e.g., in a vineyard).

In a preferred embodiment of the present invention, the motor 3 can include a robot exclusive smart actuator with fully integrated DC motor, controller, driver, sensor, reduction gear, and network in one DC servo module. For example, the motor 3 can include a ROBOTIS DYNA-MIXEL MX-64T or the like.

Preferred embodiments of the cutting device may also include a data collection system which is able to determine when a successful cutting operation has been performed. The data collection system may include a controller 58 which is able to use the output from sensors to determine if a successful cutting operation has been performed. In a preferred embodiment of the present invention, the controller 58 can also be used to control the motor 3. For example, the controller 58 can be configured or programed to control the timing, and in what direction, the motor 3 is run.

In a preferred embodiment of the present invention, the controller 58 can be located within the motor housing 10, but may be provided in other locations. Additionally, part or whole of the controller 58 and/or the functional units or blocks thereof as described herein with respect to the various preferred embodiments of the present invention can be implemented in one or more circuits or circuitry, such as an integrated circuit(s) or as an LSI (large scale integration). Each functional unit or block of the controller may be individually made into an integrated circuit chip. Alternatively, part or whole of the functional units or blocks may be integrated and made into an integrated circuit chip. Additionally, the method of forming a circuit or circuitry defining the controller is not limited to LSI, and an integrated circuit may be implemented by a dedicated circuit or a general-purpose processor or controller that is specifically programed to define a special-purpose processor or controller. Further, if technology of forming an integrated circuit, which replaces LSI, arises as a result of advances in semiconductor technology, an integrated circuit formed by that technology may be used.

Furthermore, a program which is operated in the controller and/or other elements of various preferred embodiments of the present invention, is a program (program causing a computer to perform a function or functions) controlling a controller, in order to realize functions of the various preferred embodiments according to the present invention, including each of the various circuits or circuitry described herein and recited in the claims. Therefore, information which is handled by the controller is temporarily accumulated in a RAM at the time of the processing. Thereafter, the information is stored in various types of circuitry in the form of ROMs and HDDs, and is read out by circuitry within, or included in combination with, the controller as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in preferred embodiments of the present invention. In addition, in the preferred embodiments described above, a portion or an entirety of the various functional units or blocks may be realized as an LSI which is typically an integrated circuit. Each functional unit or block of the controller may be individually chipped, or a portion thereof, or the whole thereof may be chipped by being integrated. In a case of making each functional block or unit as an integrated circuit, an integrated circuit controller that controls the integrated circuits, may be added.

Additionally, the method for making an integrated circuit is not limited to the LSI, and may be realized by a single-purpose circuit or a general-purpose processor that is programmable to perform the functions described above to define a special-purpose computer. Moreover, in a case of an appearance of a technology for making an integrated circuit which replaces the LSI due to an advance of a semiconductor technology, it is possible to use an integrated circuit depending on the technology.

Finally, it should be noted that the description and recitation in claims of this patent application referring to "controller", "circuit", or "circuitry" is in no way limited to an implementation that is hardware only, and as persons of ordinary skill in the relevant art would know and understand, such descriptions and recitations of "controller", "circuit", or "circuitry" include combined hardware and software implementations in which the controller, circuit, or circuitry is operative to perform functions and operations based on machine readable programs, software or other instructions in any form that are usable to operate the controller, circuit, or circuitry.

The sensors in a preferred embodiment of the present invention may be optical, tactile, position, and/or time sensors. For example, a strain gauge or other force sensor may be used to detect when a specific amount of motor torque is applied when performing a cutting operation. For example, in a preferred embodiment of the present invention, the motor 3 may include a sensor that can detect the amount of motor torque being applied. The amount of motor torque being applied can be used to determine that a cane, tree limb, vine, branch, etc. has been completely cut and/or estimate the required motor torque needed to completely cut a cane, tree limb, vine, branch, etc. of a specific thickness, as discussed in more detail below.

Figure 11:
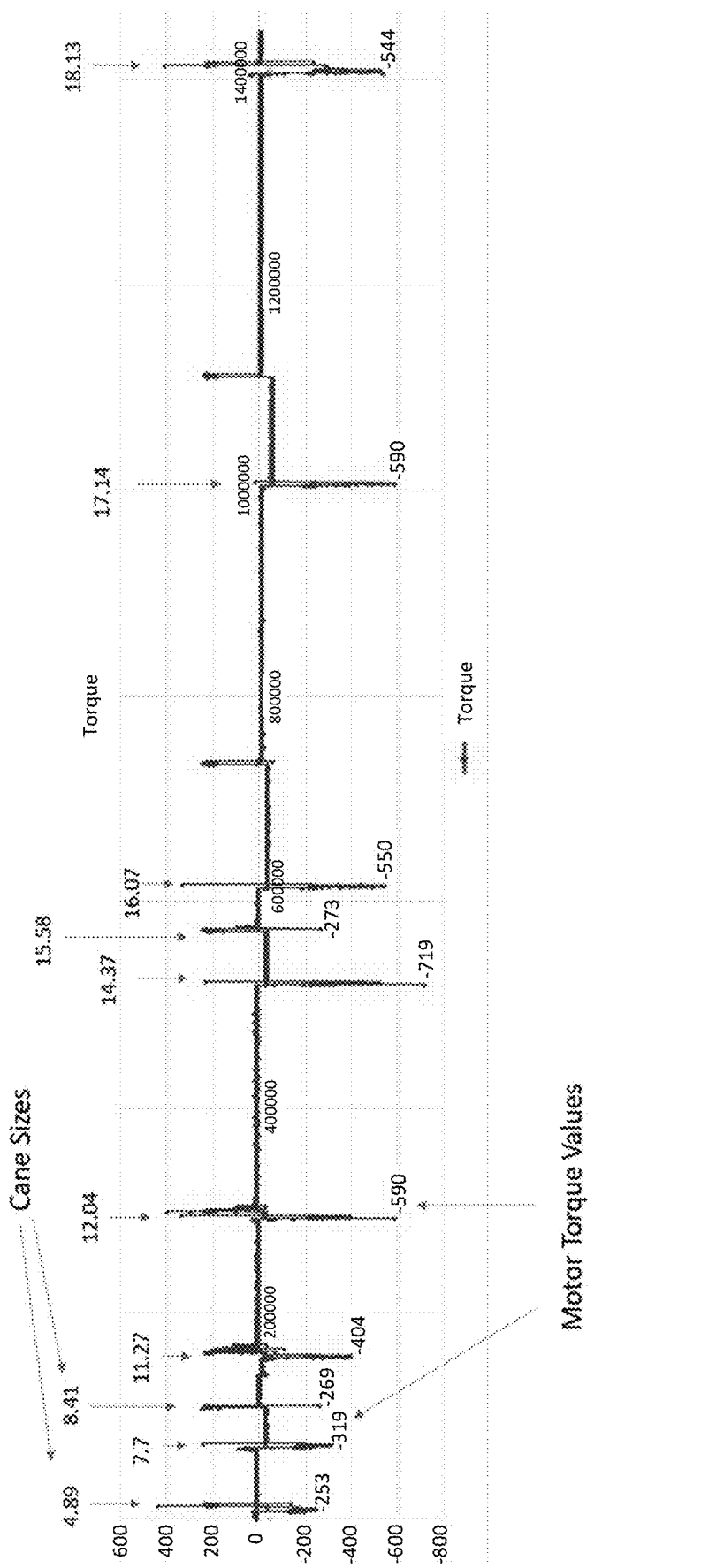
FIG. 11 shows an example of a force output graph which shows motor torque values and corresponding cane thicknesses.

FIG. 11 shows an example of a graph which connects motor torque values to cane thicknesses by showing the motor torque value that was required to cut canes of different thicknesses. In a preferred embodiment, the motor torque values shown in FIG. 11 are generated by the sensor that detects the specific amount of motor torque being applied by the motor 3. The motor torque values included in the graph shown in FIG. 11 can be used to determine when a cane, tree limb, vine, branch, etc. has been completely cut, for example, based on a decrease in the motor torque being applied by the motor after the cane, tree limb, vine, branch, etc. has been completely cut. For example, as shown in FIG. 11, after a cane with a 12.04 mm diameter has been cut, the motor torque value of 590 N rapidly decreased towards a motor torque value of 0 N. In a preferred embodiment of the present invention, the controller 58 can be configured or programmed to determine that the cane, tree limb, vine, branch, etc. has been completely cut when the motor torque value being detected decreases by a predetermined amount or more within a predetermined amount of time.

In a preferred embodiment of the present invention, the values included in the graph shown in FIG. 11 can also be used to estimate the required motor torque needed to completely cut a cane, tree limb, vine, branch, etc. of a specific thickness. For example, the graph shown in FIG. 11 can be used to create a table that estimates the required motor torque needed to completely cut a cane, tree limb, vine, branch, etc. of a specific thickness based on values of motor torque that were required to completely cut previously cut cane, tree limb, vine, branch, etc. of specific thicknesses. For example, the graph shown in FIG. 11 shows that a cane with a 7.7 mm diameter required 319 N to completely cut through the cane, and that a cane with a 12.04 mm diameter required 590 N to completely cut through the cane. In a preferred embodiment of the present invention, the controller 58 is configured or programmed to estimate a motor torque needed to completely cut a cane, tree limb, vine, branch, etc. of a specific thickness.

Figure 12:
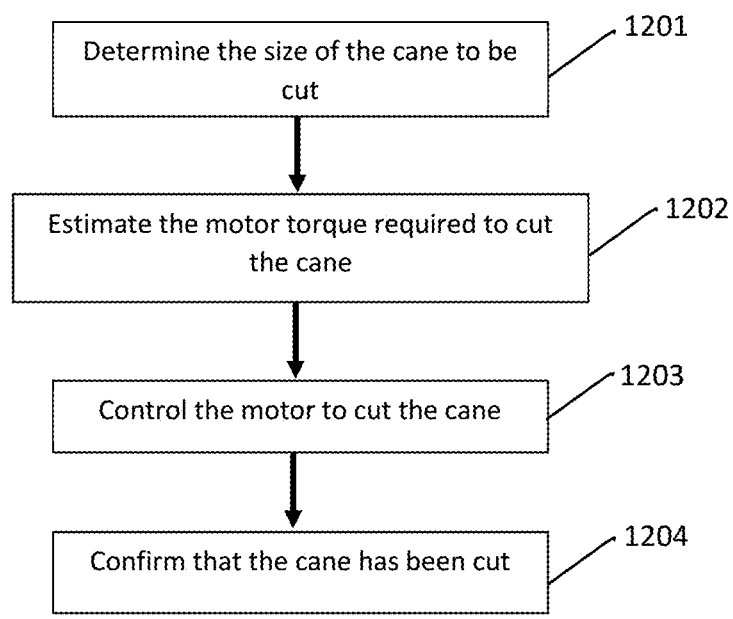
FIG. 12 is a flowchart showing a process performed according to a preferred embodiment of the present invention.

FIG. 12 is a flowchart showing a process performed according to a preferred embodiment of the present invention. In step 1201, the size of a cane (e.g., the diameter of a cane) that is to be cut is determined/obtained. For example, the size of the cane to be cut can be determined by manually measuring the size of the cane, determining the size of the cane based on a picture of the cane, or another method. In step 1202, the motor torque required to cut the cane is estimated based on the size of the cane determined in step 1201. Then, in step 1203, the motor 3 is controlled based on the motor torque required to cut the cane estimated in step 1202. For example, in step 1203, the motor 3 can be controlled to apply a motor torque that is 1.5 or 2 times the motor torque estimated in step 1202 in order to ensure with more certainty that the cane will be cut. Then, in step 1204, based on the motor torque values generated by the sensor that detects the specific amount of motor torque being applied by the motor 3, it is determined/confirmed that the cane has been cut. For example, as discussed above, it is determined that the cane has been completely cut when the motor torque value being detected decreases by a predetermined amount or more within a predetermined amount of time. In a preferred embodiment of the present invention, the controller 58 is configured or programmed to perform steps 1201 through 1204 of FIG. 12.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A cutting device comprising:
a base plate extending in a longitudinal direction;
a motor attached to the base plate;
a driving cord including a first end and a second end, the first end being attached to the motor;
a cutting assembly including:
a fixed blade that is fixed to the base plate; and
a driven blade that moves with respect to the fixed blade, the driven blade and the fixed blade being joined at a pivot point;
a cutting pulley attached to a side surface of a lever end of the driven blade and supporting the driving cord; and
a support pulley affixed to the base plate; wherein
the second end of the driving cord is attached to the driven blade to move the driven blade with respect to the fixed blade when the motor rotates;
the motor includes a motor driven pulley to which the first end of the driving cord is affixed;
a portion of the driving cord which is located between the first end and the second end is engaged with the support pulley;
the motor driven pulley is located between the support pulley and the cutting pulley in a direction in which the fixed blade and the driven blade are spaced apart from each other; and
the direction in which the fixed blade and the driven blade are spaced apart from each other is perpendicular to the longitudinal direction of the base plate and perpendicular to a direction in which an axis of the pivot point extends.

2. The cutting device according to claim 1, wherein
the support pulley includes a spool and a bearing which are connected to the base plate in a manner such that the spool may rotate with respect to the base plate.

3. The cutting device according to claim 2, wherein
the support pulley includes a first support pulley and a second support pulley;
the first support pulley includes a first spool and a first bearing;
the second support pulley includes a second spool and a second bearing; and
the first spool and the first bearing are axially spaced apart from the second spool and the second bearing.

4. The cutting device according to claim 1, wherein
a diameter of the support pulley is greater than a diameter of the motor driven pulley.

5. The cutting device according to claim 1, wherein
the driving cord has a serpentine or zig-zag shape when the driving cord contacts the motor driven pulley, the support pulley, the cutting pulley, and the driven blade.

6. The cutting device according to claim 1, wherein
the fixed blade is attached to the base plate by fasteners which extend through a base of the fixed blade; and
the fasteners are spaced apart from one another along an extending direction of the fixed blade.

7. The cutting device according to claim 6, wherein
the base of the fixed blade is spaced away from the base plate with a gap therebetween.

8. The cutting device according to claim 1, further comprising:
a gripper which is structured to grasp an object which is being cut by the cutting assembly; wherein
the gripper is mounted on the base plate and extends parallel to the cutting assembly.

9. The cutting device according to claim 8, wherein
the gripper and the cutting assembly are fixed to opposite sides of the base plate in the direction in which the axis of the pivot point extends.

10. The cutting device according to claim 9, wherein
the gripper includes a pair of gripping arms which are spaced apart from each other in a same direction that the fixed blade and the driven blade are spaced apart from each other.

11. The cutting device according to claim 10, wherein
the pair of gripping arms are structured to actuate towards and away from each other;
the pair of gripping arms include first gripping surfaces and second gripping surfaces each including ridged gripping projections; and
each of the pair of gripping arms includes an indented portion between the first gripping surfaces and the second gripping surfaces of each of the gripping arms.

12. The cutting device according to claim 11, wherein
the pair of gripping arms are connected to respective actuating arms which are driven to open and close in conjunction with operation of the cutting assembly.

13. The cutting device according to claim 12, wherein
the actuating arms are driven such that the gripper will close to grasp the object before the object is cut by the cutting assembly such that the gripper will hold and support the object after the object has been cut; and
the gripper is operated directly or indirectly by the motor.

14. The cutting device according to claim 9, wherein
the gripper is operated by a driven gear shaft which is rotated by an additional cord connected to the motor.

15. The cutting device according to claim 14, wherein
the driven gear shaft includes a pinion gear which meshes with an arm gear of the gripper.

16. The cutting device according to claim 15, wherein
the gripper further includes actuating arms which are connected to projections of the arm gear, the actuating arms articulate gripping arms of the gripper once the pinion gear meshes with the arm gear.

17. The cutting device according to claim 1, further comprising:
a cover which covers portions of the motor, the driving cord, and the cutting assembly; wherein
the cover includes a housing and a lid which is removable from the housing.

18. The cutting device according to claim 1, further comprising:
a controller; wherein
the controller is configured or programmed to control the motor; and
the controller is configured or programmed to estimate a motor torque required to cut an object of a specific size and/or determine that the object has been cut.

19. The cutting device according to claim 1, wherein
the motor is housed in a motor housing; and
the base plate is a monolithic base plate to which the motor housing is directly fixed.

* * * * *